A. E. FRANZ.
SHOE LACE FASTENER.
APPLICATION FILED FEB. 28, 1911.
1,018,557.
Patented Feb. 27, 1912.
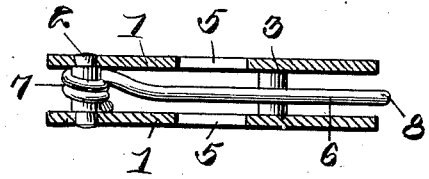
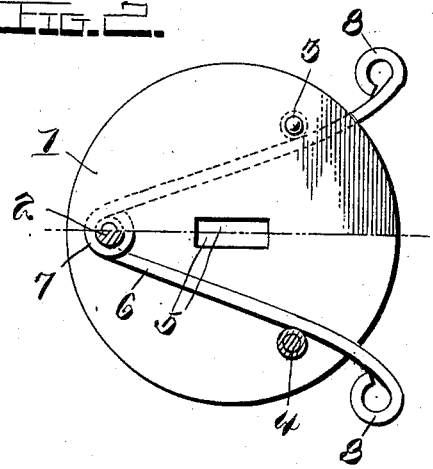
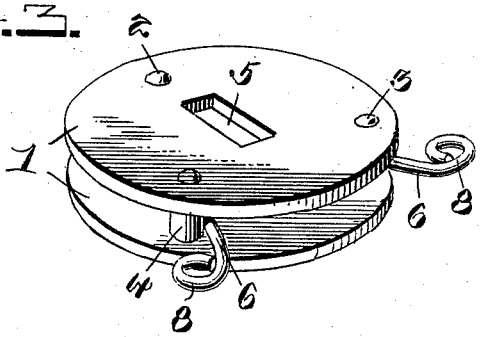
Witnesses
Chas. L. Griesbauer.
L. G. Ellis.
Inventor
August E. Franz.
By Watson E. Coleman.
Attorney

UNITED STATES PATENT OFFICE.

AUGUST E. FRANZ, OF WEST CHESTER, PENNSYLVANIA.

SHOE-LACE FASTENER.

1,018,557. Specification of Letters Patent. Patented Feb. 27, 1912.

Application filed February 28, 1911. Serial No. 611,348.

*To all whom it may concern:*

Be it known that I, AUGUST E. FRANZ, a citizen of the United States, residing at West Chester, in the county of Chester and State of Pennsylvania, have invented certain new and useful Improvements in Shoe-Lace Fasteners, of which the following is a specification, reference being had to the accompanying drawings.

This invention is an improved fastener for shoe laces and other like articles, to prevent the same from slipping and becoming untied, the object of the invention being to provide a novel form of fastener of this character which is extremely cheap and simple, may be readily operated, and which is capable of being ornamented so that it may present a very sightly appearance.

The invention consists in the construction, combination and arrangement of devices hereinafter described and claimed.

In the accompanying drawings—Figure 1 is a longitudinal sectional view of the shoe lace fastener constructed in accordance with my invention. Fig. 2 is partly a plan and partly a sectional view of the same. Fig. 3 is a perspective view of the same.

My improved shoe lace fastener has a casing which is here shown as comprising a pair of circular plates 1, which are connected together by pins 2, 3 and 4, which are appropriately spaced apart. These pins serve to connect the plates and to retain them in spaced relation. The plates 1 are provided with centrally disposed openings 5, which are preferably rectangular in form. A pair of locking arms 6 are disposed in the space between the plates 1, and also between the pins or studs 3, 4. These locking arms converge toward the pin 2, and their converging ends are connected together by a spring coil 7 which encircles the pin 2. The spring locking arms are provided at their outer ends which project beyond the plates 1, with loops or eyes 8, which may be readily grasped and moved toward each other, so as to impart corresponding movement to the arms against the tension of the spring coil 7.

When applying the fastener to the end portions of a shoe lace, the shoe lace has its end portions passed through the openings 5, and disposed on the outer sides of the arms 6. This may be readily done by first moving each arm inwardly so as to clear and move past the openings 5, before passing the ends of the lace through the said openings. The arms act by the spring 7 to move outwardly and become engaged with the opposing sides of the pins 3, 4, and hence bights are formed in the lace between the plates 1, and the said arms lie in the bights of the lace and draw outwardly thereon, thus clamping the lace between the plates 1, and against the sides of the openings 5, and hence securely holding the fastener on the lace and preventing it from slipping.

It will be understood that the ends of the lace on the outer side of the fastener may be tied in any suitable bow, and it will also be understood that the fastener may be made of any suitable material, and may if preferred, be ornamented so that while acting as a fastener for a shoelace, it will also serve as an adornment for the shoe.

To release the fastener from the lace to permit the adjustment or removal of the lace, it is only necessary to press the arms 6 toward each other, to cause them to occupy a position across the centers of the openings 5, and the fastener may then be readily slipped on the lace.

I claim:—

1. A shoelace fastener of the class described comprising a body having a pair of spaced walls provided with openings to enable a shoelace to be passed therethrough, pins connecting the walls together and a pair of spring locking arms disposed in the space between and also spaced from the plates and converging in one direction and movable toward and from each other across the openings of the spaced plates, the converging ends of the said locking arms being connected to one of the pins, the other pins forming stops to limit the outward movement of said locking arms.

2. The herein described shoelace fastener comprising a body having a pair of spaced walls provided with central openings to enable a shoelace to be passed therethrough, pins connecting the walls together, a pair of locking arms disposed in the space between the walls, spaced from the said walls and also disposed between two of the said pins, said locking arms converging toward another pin and their converging ends being connected together by a spring coil which encircles the last mentioned pin.

In testimony whereof I hereunto affix my signature in the presence of two witnesses.

AUGUST E. FRANZ.

Witnesses:
CLARA ALICE FRANZ,
KATIE T. O'BRIEN.

Copies of this patent may be obtained for five cents each, by addressing the "Commissioner of Patents, Washington, D. C."